United States Patent [19]

Kanemaru et al.

[11] 4,187,018
[45] Feb. 5, 1980

[54] AUTOMATIC CONTROL CIRCUIT SYSTEM FOR CAMERAS PROVIDED WITH A FOCAL-PLANE SHUTTER HAVING FRONT AND REAR SCREENS

[75] Inventors: Kenji Kanemaru, Chiryu; Takashiroh Iwasaki, Tokyo, both of Japan

[73] Assignee: Hitachi, Ltd., Tokyo, Japan

[21] Appl. No.: 923,197

[22] Filed: Jul. 10, 1978

[30] Foreign Application Priority Data

Jul. 18, 1977 [JP] Japan .................................. 52-85061

[51] Int. Cl.² .......................... G03B 7/08; G03B 17/38
[52] U.S. Cl. .................................... 354/266; 354/60 R
[58] Field of Search ................. 354/50, 51, 60 R, 234, 354/235, 266, 267

[56] References Cited

U.S. PATENT DOCUMENTS

| 3,810,227 | 5/1974 | Taguchi et al. ................. 354/266 X |
| 4,037,236 | 7/1977 | Numata et al. ................. 354/60 R X |
| 4,145,130 | 3/1979 | Shimizu et al. ................. 354/60 R X |

FOREIGN PATENT DOCUMENTS

| 2351192 | 5/1974 | Fed. Rep. of Germany . |
| 2308108 | 7/1974 | Fed. Rep. of Germany . |
| 2550112 | 5/1976 | Fed. Rep. of Germany . |

*Primary Examiner*—Michael L. Gellner
*Attorney, Agent, or Firm*—Craig and Antonelli

[57] ABSTRACT

An automatic control circuit system for cameras provided with a focal-plane shutter having front and rear screens, in which a battery voltage is supplied into the automatic control circuit system via a semiconductor switching element when a first release switch of a two-step release switch of a two-step release switch is closed. When a second release switch is closed, the rear screen starts running. A potential for electrically turning on the semiconductor switching element when the first release switch is closed is applied to a control electrode of the switching element. The automatic control circuit system is provided with an electric signal holding circuit, which is triggered with an electric signal generated when the second release switch is closed, to hold at the output terminal of the control electrode an output signal whereby an electric signal for electrically turning on the semiconductor switching element is held in the control electrode and retain the supply of the battery voltage into the automatic control circuit system. The electric signal holding circuit is triggered in response to a rear screen control signal whereby the starting of running of the rear screen of the focal-plane shutter is instructed, to reverse the holding of the output signal so that the semiconductor switching element is electrically turned off with the supply of the battery voltage into the automatic control circuit system stopped.

5 Claims, 5 Drawing Figures

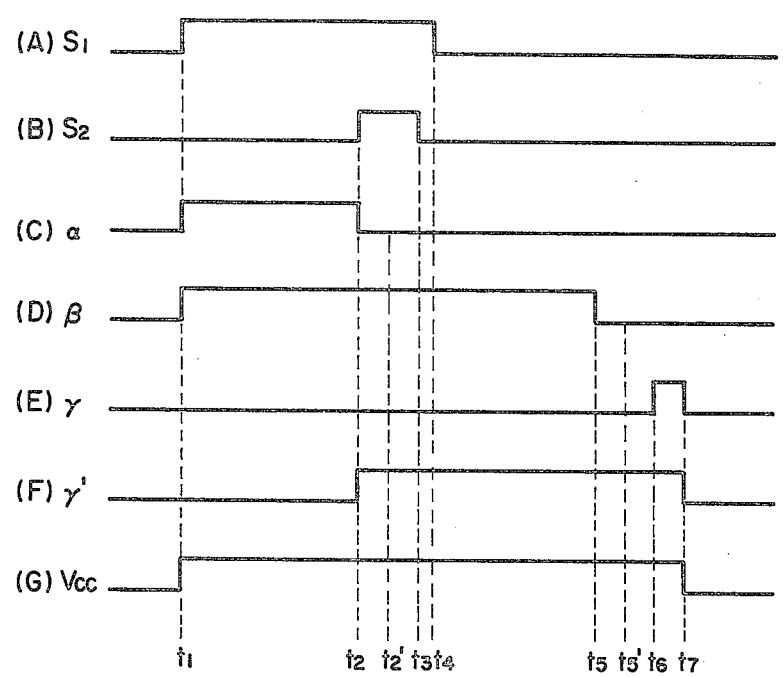

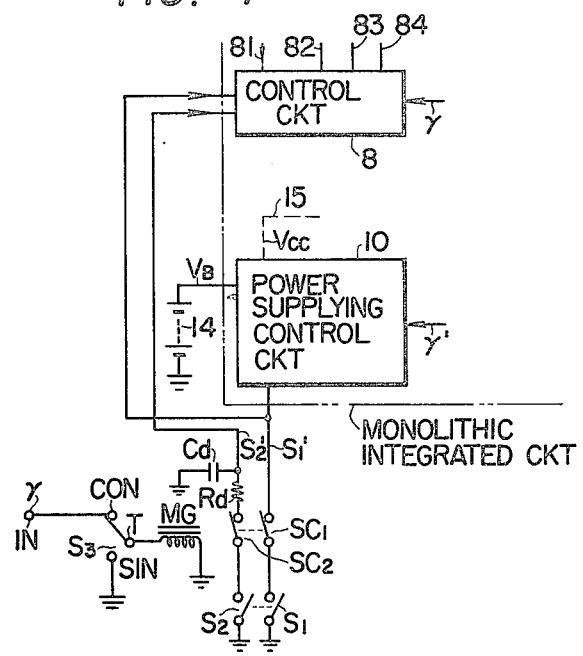
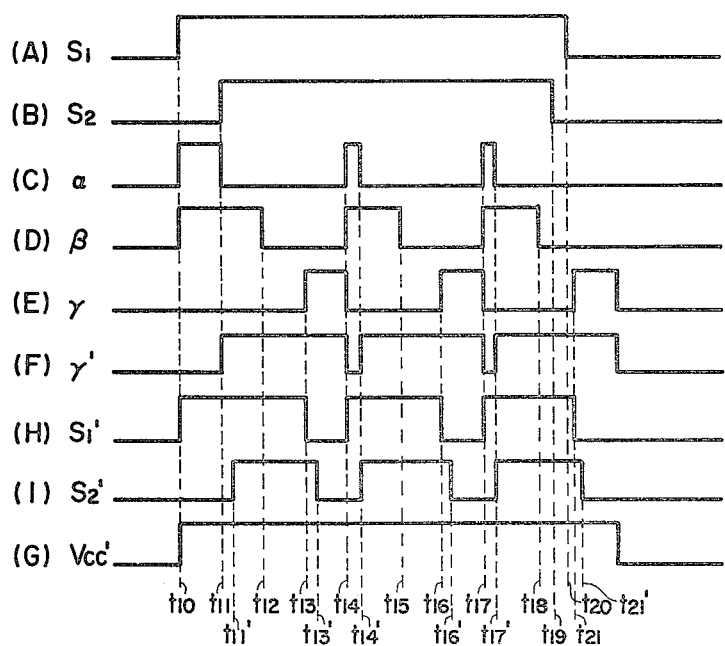

AUTOMATIC CONTROL CIRCUIT SYSTEM FOR CAMERAS PROVIDED WITH A FOCAL-PLANE SHUTTER HAVING FRONT AND REAR SCREENS

BACKGROUND OF THE INVENTION

The present invention relates to a control system for cameras provided with an electronically controlled focal-plane shutter.

An integrated circuit for electronically controlling an instant picture camera in which an electronic shutter mechanism and an aperture mechanism are controlled by a single output solenoid is known well from 1977 IEEE International Solid-State Circuits Conference DIGEST OF TECHNICAL PAPERS p214–p215 T. M. Frederksen et al "A Single-Chip, All Bipolar, Camera Control IC".

It is necessary in a TTL (Through The Lens) type single lens reflex camera, which permits an accurate exposure by measuring the light passed through the lens in the light path in the camera body without considering the correction coefficient of lens filter, that a shutter mechanism and an aperture mechanism be controlled independently of each other. The electronic shutter for this TTL type single lens reflex camera is a focal-plane shutter having a front shutter blind for exposing the film and a rear shutter blind for screening the light. Both of these shutter blinds are mechanically held at once when the film is wound up.

In an automatically controlled camera, in which the iris value or shutter speed is electronically calculated and controlled with reference to a measured light value, an electric power is supplied into an automatic control circuit therein when a shutter button is depressed, to calculate the iris value or shutter speed on the basis of input information including measured light value and memorize the calculated value. The film is thereafter exposed under the memorized conditions. The exposure time for the film, i.e. the shutter speed is determined by the difference between the time of sliding movement of the front shutter blind and the time of sliding movement of the rear shutter blind. The sliding of the front and rear shutter blinds is carried out by mechanically releasing the shutter blinds mechanically retained.

In a conventional automatically controlled camera, a voltage from a battery inside the camera is supplied into an automatic control circuit through a mechanical operation of a power switch. Namely, a mechanical power switch is turned on when a first release switch of a two-step release switch (light measuring switch) is turned on, to start supplying a battery voltage into the automatic control circuit. When a second release switch (shutter switch) is turned on, a shutter action is made as the rear shutter blind is slided. After the shutter action has been finished, the first release switch is turned off so that the mechanical power switch is turned off to stop the supply of battery voltage into the automatic control circuit.

In order to start and stop the supply of battery voltage into the automatic control circuit in a conventional automatically controlled camera, it is necessary that the mechanical power switch be turned on and off in accordance with the operations of the mechanical two-step release switch. Then, the construction of the mechanical power switch becomes complicated and the operations of the switch are not reliable.

SUMMARY OF THE INVENTION

Therefore, an object of the present invention is to improve the reliability of actions of starting and stopping the supply of battery voltage into the automatic control circuit in a camera provided with a focal-plane shutter.

To this end, according to the invention, there is provided an automatic control circuit system for cameras provided with a focal-plane shutter having front and rear screens, which comprises a first release switch serving when it is closed to supply a battery voltage into an automatic control circuit system via a power switch means, and a second release switch serving when it is closed to start the running of the rear screen after the lapse of a time corresponding to a predetermined shutter speed, the second release switch being mechanically interlocked with the first release switch so as to allow the latter to be closed while the former is closed, the power switch means being a semi-conductor switching element having first and second electrodes and a control electrode, the electrical conduction and non-conduction between the first and second electrodes being controlled by an electric signal applied to the control electrode, the first and second electrodes being connected to the battery and a power supplying line in the automatic control circuit system, respectively, the control electrode being electrically connected to the first release switch to allow an electric potential to be applied thereto so that the first and second electrode are electrically conducted to each other by a closing action of the first release switch or second release switch, the automatic control circuit system being provided with an electric signal holding circuit which is triggered with an electric signal generated by the closing action of the second release switch to hold at an output terminal an output signal which holds at the control electrode an electric signal which conducts electrically between the first and second electrodes of the semiconductor switching element so that the supply of the battery voltage into the automatic control circuit system is held, the electric signal holding circuit being triggered in response to an electric signal which is generated basing on the closing of the second release switch when an instruction to start the running of the rear screen of the focal-plane shutter is given or after a predetermined period of time has elapsed after the instruction was given, to reverse the holding of the output signal so that the first and second electrodes can be electrically non-conducted from each other and the supply of the battery voltage into the automatic control circuit system can be stopped.

Another object of the present invention is to conduct automatic continuous photographing under optimum photographing conditions with an automatic control circuit system in a camera provided with a focal-plane shutter even when a measured light value is varied during the photographing operation.

An automatic control circuit system for cameras provided with a focal-plane shutter having front and rear screens, which serves to achieve the above object, includes a calculation circuit for calculating an analog amount of electricity by which the photographing conditions are determined with reference to a measured light value and sensitivity of the film, an analog to digital converter for converting the calculated analog amount of electricity into a digital signal, a memory circuit for memorizing a digital signal obtained from the analog to digital converter, and a photographing means for photographing in accordance with the digital signal in the memory circuit and for generating a rear screen control signal for instructing of releasing of the mechanical holding of the rear screen and of the running of the same, a system resetting signal having a predetermined pulse width being generated in accordance with changes in the wave form of the rear screen control signal to thereby erase the digital information memorized by the memory circuit.

The above and other objects as well as advantageous features of the invention will become apparent from the following description of the preferred embodiments taken in conjunction with the accompanying drawings.

BRIEF DESCRIPTION OF THE DRAWINGS

FIG. 3 shows the wave forms of signals generated at various portions of the embodiment as shown in FIG. 1;

FIG. 4 is a circuit diagram of a principal portion of a second embodiment of the automatic control circuit system for cameras according to the present invention; and FIG. 5 shows the wave forms of signals generated at various portions of the embodiment shown in FIG. 4.

DESCRIPTION OF THE PREFERRED EMBODIMENTS

The present invention will be concretely described with reference to embodiments thereof.

Figure 1:
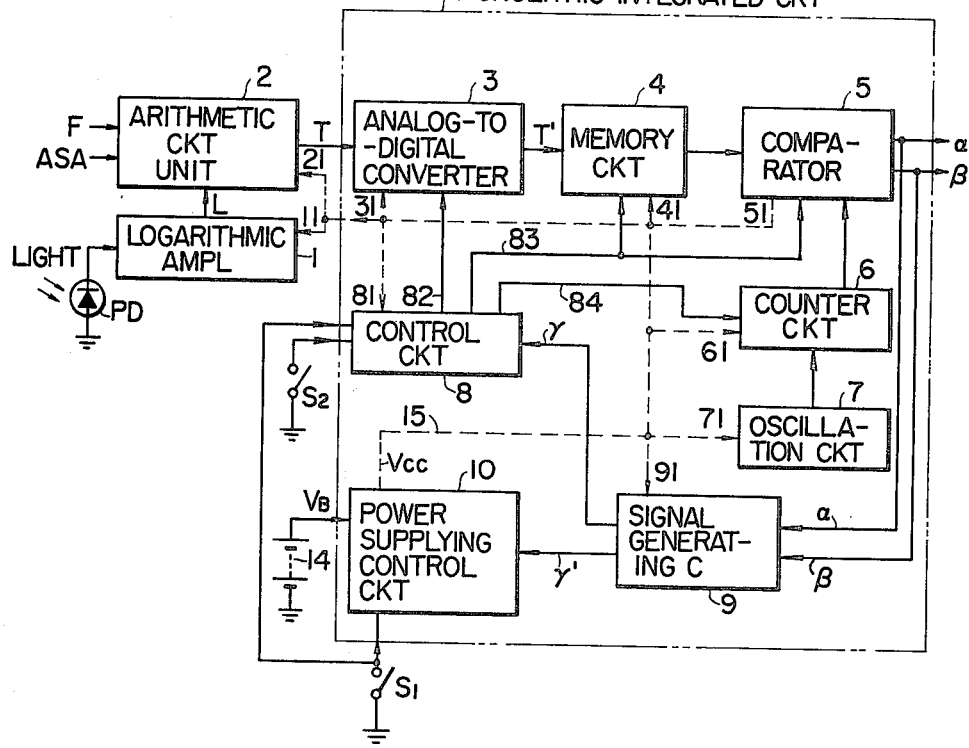
FIG. 1 is a block diagram of a principal portion of a first embodiment of the automatic control circuit system for cameras according to the present invention.

FIG. 1 is a block diagram of an embodiment of the present invention, and the circuit blocks within a box of a dotted line therein are provided in a monothilic semiconductor integrated circuit.

The embodiment as shown in FIG. 1 is an iris-preferential type control system for cameras, which comprises an arithmetic circuit unit 2 for calculating a shutter speed value T on the basis of an input of an iris value F and an ASA sensitivity value ASA of a film or a DIN sensitivity value value thereof, and a measured light value L obtained from a photocell PD and amplified by a logarithmic amplifier 1; an analog to digital (A/D) converter 3 for converting a shutter speed value T obtained in an analog value into a digital value; a memory circuit for memorizing the digital value; a comparator 5 for comparing the digital value with an output from a counter circuit 6, in which a predetermined pulse is counted, to produce signals, whereby front and rear screens are controlled, and obtain a shutter-opening time corresponding to the digital value; an oscillation circuit 7 for supplying a predetermined pulse into the counter 6; a signal generating circuit 9; and a power supplying control circuit 10.

According to this embodiment, the signal generating circuit 9 produces a one-shot pulse γ which is later than the rear screen controlling signal β by at least the rear screen moving time. An order for resetting the system is given to a control circuit 8 at the moment corresponding to the front edge of the one-shot pulse, and an order for releasing the power supplying control circuit 10 from a power supply retaining operation is given at the moment corresponding to the back edge of the one-shot pulse.

FIG. 3(A) shows the wave form of light measuring switch signal based on the opening and closing operations of a light measuring switch $S_1$. The light measuring switch $S_1$ is a first release switch of a two-step release switch which constitutes a shutter switch, and it is turned on at a time $t_1$. When the switch $S_1$ is turned on, a voltage Vcc obtained from a voltage VB of a battery 14 provided in the camera is supplied from the power supplying control circuit 10 into a power supplying line 15 in the control circuit system [refer to FIG. 3(G)]. The power supplying line 15 is connected to a power supplying line 11 for the logarithmic amplifier 1, a power supplying line 21 for the arithmetic circuit unit 2, a power supplying line 31 for the A/D converter circuit 3, a power supplying line 41 for the memory circuit 4, a power supplying line 51 for the comparator 5, a power supplying line 61 for the counter 6, a power supplying line 71 for the oscillation circuit, a power supplying line 81 for the control circuit 8, and a power supplying line 91 for the signal generating circuit 9. Consequently, after the time $t_1$ at which the light measuring switch $S_1$ is turned on, a shutter speed value T is calculated by the artithmetic circuit unit 2 on the basis of an input of an iris value F and an ASA sensitivity value ASA of a film and measured light value L obtained from the photocell PD and amplified by the logarithmic amplifier 1.

The iris is then adjusted. When the switch $S_1$ is then turned off, the supply of electric current is stopped so that the control system is returned to its original state.

FIG. 3(B) shows the wave form of the shutter switch signal based on the opening and closing operations of a second release switch $S_2$, which is turned on at a time $t_2$.

FIG. 3(C) shows the wave form of the front screen control signal α, and the wave is raised when the light measuring switch $S_1$ is turned on at the time $t_1$. This change in the wave form is transmitted to a solenoid on a front screen retaining and releasing magnet to mechanically retain the front screen.

FIG. 3(D) shows the wave form of the rear screen control signal β, and the wave is raised when the light measuring switch $S_1$ is turned on at the time $t_1$. This change in the wave form is transmitted to the solenoid on the rear screen retaining and releasing magnet to mechanically retain the rear screen in the same manner.

As shown in FIG. 3(C), the wave form of the front screen control signal α falls when the shutter switch $S_2$ is turned on at a time $t_2$. This change in the wave form is transmitted to the solenoid on the front screen retaining and releasing magnet to mechanically release the front screen. At this time, the front screen starts running, and it is mechanically stopped at a time $t_2'$.

After the light measuring switch $S_1$ has been turned on at the time $t_1$, a continuous control pulse is sent from the control circuit 8 to a control line 82 to control the A/D converter 3. As a result, the shutter speed T changed in accordance with the measured light value L is converted into digital value every moment with the continuous control pulse to send out a momentarily changed digital shutter speed value T'.

When the shutter switch $S_2$ is turned on at the time $t_2$, a memory control signal is sent from the control circuit 8 to a control line 83 to allow the newest shutter speed value T' to be memorized by the memory circuit 4. At the time $t_2$, an instruction signal for starting counting is sent from the control circuit 8 to a control line 84 to allow the counter 6 to start counting pulse signal sent from the oscillation circuit 7.

FIG. 3(F) shows the wave form of a power supplying and retaining signal $\gamma'$ obtained from the signal generating circuit 9, and the wave is raised when the shutter switch $S_2$ is turned on at the time $t_2$. Since the signal $\gamma'$ is applied to the power supplying control circuit 10, a voltage Vcc is sent therefrom to the power supplying line 15 until a time $t_5$ at which the wave of the rear screen control signal $\beta$ falls to mechanically release the rear screen to a time at which a series of photographing operations have been finished, even when the shutter switch $S_2$ and light measuring switch $S_1$ are turned off at times $t_3$, $t_4$, respectively, [refer to FIG. 3(G)].

When the counting of the pulse signal in the counter 6 has progressed so that the digital information in the counter 6 agrees with the digital shutter speed value in the memory circuit 4 at a time $t_5$, the comparator 5 is instantly actuated to perform comparing actions and allow the wave of the rear screen control signal $\beta$ to fall. This change in the wave form is transmitted to the solenoid of the rear screen retaining and releasing magnet. At this time, the rear screen is mechanically released to start running and mechanically stopped at a time $t_5'$.

FIG. 3(E) shows the wave form of a system resetting signal $\gamma$, and wave is raised at a time $t_6$ which is later than the time $t_5$ at which the wave of the rear screen control signal $\beta$ falls, and which is still later than the time $t_5'$ at which the sliding or running rear screen is mechanically stopped. The wave form of this system resetting signal $\gamma$ is raised as it is electrically triggered when the rear screen control signal $\beta$ is electrically delayed to cause the wave thereof to fall. This system resetting signal $\gamma$ is a one-shot pulse having a predetermined pulse width, and the wave thereof falls at a time $t_7$.

When the system resetting signal $\gamma$ is applied to the control circuit 8, the digital shutter speed value T' memorized by the memory circuit and the digital information counted by the counter 6 are thereby erased so as to put the automatic control system as a whole into the original state.

In the meantime, the signal generating circuit 9 gives an instruction to drop the wave of the power supplying and retaining signal $\gamma'$ at the time $t_7$ at which the wave of the system resetting signal $\gamma$ falls to form the back edge thereof [refer to FIGS. 3(E) and 3(F)]. When the power supplying and retaining signal $\gamma'$ falls at the time $t_7$, the power supplying control circuit stops supplying into the power supplying line 15 the voltage Vcc obtained from the voltage VB of the battery 14.

Figure 2:
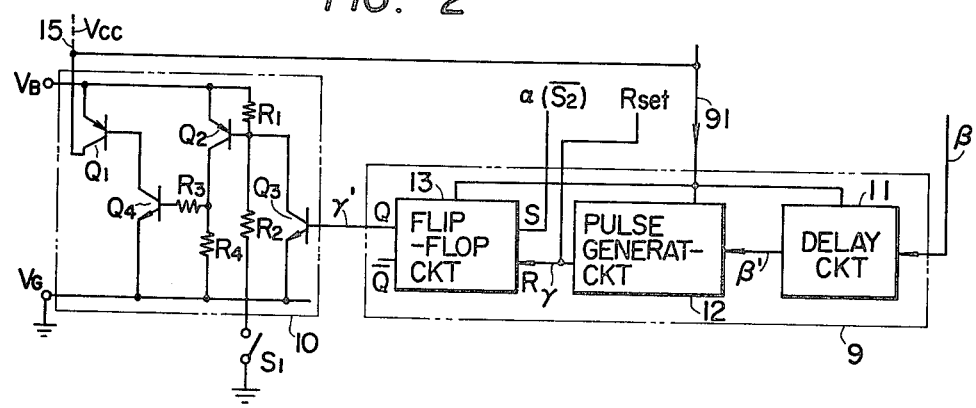
FIG. 2 is a detailed circuit diagram showing a part of the embodiment as shown in FIG. 1.

FIG. 2 is a circuit diagram of an example of the power supplying control circuit 10 and signal generating circuit 9 which constitute a pricipal portion of the present invention.

The signal generating circuit 9 comprises, for example, a delay circuit 11 consisting of a delay circuit for delaying the rear screen control signal $\beta$ or a time constant circuit, a pulse generating circuit 12 consisting of a one-shot multivibrator, and a flip-flop circuit 13 utilizing the front screen control signal $\alpha$ or switch signal $S_2$ as a setting input and the pulse output $\gamma$ as a resetting input, to produce the above-mentioned pulse signals $\gamma$, $\gamma'$.

The power supplying control circuit 10 comprises a pnp transistor $Q_2$, a transistor $Q_4$ controlled by a collector output of the transistor $Q_2$, a transistor $Q_1$ in which an electric signal based on the light measuring switch $S_1$ is applied to the base thereof to supply the battery voltage VB to the power supplying line 15 of the camera control system via the emitter/collector thereof, and a holding transistor $Q_3$ electrically connected in parallel to the switch $S_1$ to secure the supply of a battery voltage for the automatic control system. The transistor $Q_3$ is controlled by the control signal $\gamma'$. Then, when the switch $S_1$ or holding transistor $Q_3$ is turned on, the transistors $Q_2$, $Q_4$ are turned on to allow the power supplying switch transistor $Q_1$ to be turned on.

When the light measuring switch $S_1$ is turned on at the time $t_1$, the transistors $Q_2$, $Q_4$ are turned on to allow the power supplying switch transistor $Q_1$ to be turned on. At this time, the battery voltage VB is supplied via the emitter/collector circuit of the transistor $Q_1$ into the power supplying line 15 as a source voltage Vcc for the automatic control system.

When the shutter switch $S_2$ is turned on at the time $t_2$, the wave of shutter switch signal $S_2$ rises [refer to FIG. 3(B)] and the wave of front screen control signal $\alpha$ instantly falls, and either one of these changes in the wave form is transmitted to the flip-flop circuit 13 in the signal generating circuit 9 as a setting input S to allow the wave of power supplying and retaining signal $\gamma$ obtained from an output Q of the flip-flop circuit 13 to be raised [refer to FIG. 3(F)].

The flip-flop circuit 13 keeps the wave raised of the signal $\gamma'$ unless a trigger signal is supplied thereinto as a resetting input. Therefore, after the time $t_2$, a high-level power supplying and retaining signal $\gamma'$ obtained from the output Q of this flip-flop circuit 13 is applied into the base of the transistor $Q_3$ in the power supplying control circuit 10. Then, the transistor $Q_3$ is turned on and kept in an "on" condition. Consequently, even when the shutter switch $S_2$ and light measuring switch $S_1$ are turned off later at the time $t_3$, $t_4$, respectively, the flip-flop circuit 13 is kept in the above-mentioned condition, and this allows the transistor $Q_3$ to be kept in an "on" condition. As long as the transistor $Q_3$ is kept in an "on" condition, the transistors $Q_2$, $Q_4$ are also kept in an "on" condition. At this time, the power supplying transistor $Q_1$ is also kept in an "on" condition, and, as a result, a battery voltage VB is continuously supplied from the power supplying control circuit 10 into the power supplying line 15 as a source voltage Vcc for the automatic control system.

On the other hand, the delay time of the delay circuit 11 is so set as to drop the wave of the rear screen control signal $\beta$ at the time $t_5$, mechanically stop the running of rear screen at the time $t_5'$, and raise the wave of the system resetting control signal $\gamma$ at the time $t_6$ which is later than the time $t_5$. Then, the wave of delay signal $\beta'$ obtained from the delay circuit 11 falls at the time $t_6$.

The pulse generating circuit 12 is triggered in accordance with the change in the wave form of the delay signal $\beta'$ at the time $t_6$ and generates a system resetting signal $\gamma$ of a predetermined pulse width the wave of which is raised at the time $t_6$ and falls at a time $t_7$ which is determined by the pulse width thereof.

The flip-flop circuit 13 is triggered into a condition opposite to the one as mentioned above when the wave of the system resetting signal $\gamma$ applied to the resetting input R thereof falls at the time $t_7$ and then, the wave of the power supplying and retaining signal $\gamma'$ obtained from the output Q of the circuit 13 falls at the time $t_7$ [refer to FIG. 3(F)]. Consequently, after the time $t_7$, a low-level power supplying and retaining signal $\gamma'$ obtained from the output Q of the flip-flop circuit 13 retained in a new condition is applied to the transistor $Q_3$ in the power supplying control circuit 10 so as to turn off the transistor $Q_3$. Therefore, if the light measuring switch $S_1$ has already been turned off at this time, the transistors $Q_2$, $Q_4$ in the power supplying control circuit 10 are turned off. This allows the power supplying transistor $Q_1$ to be turned off and, as a result, the power supplying control circuit 10 stops supplying battery voltage VB into the power supplying line 15 as a source voltage Vcc for the automatic control system.

According to the above-described embodiment of the present invention, the supplying of a battery voltage into an automatic control circuit in an automatically controlled camera is started and stopped by an electronic switching operation of a semiconductor switching element (transistor $Q_1$), which is electronically controlled by the mechanical switching operation of a first release switch (light measuring switch) of a two-step release switch, mechanical switching operation of a second release switch (shutter switch), and a rear screen control signal of a focal-plane shutter. Then, the operation of the present invention is highly reliable to permit achieving the object thereof.

According to the above-described embodiment, the shutter speed value T is increased by the controlling operation of the automatic control circuit under photographing conditions including a low illumination. In spite of this, the semiconductor switching element is kept in an "on" condition at least until the rear screen has mechanically stopped running by the power supplying and retaining signal $\gamma'$ generated by the flip-flop 13 in the signal generating circuit 9, even if the second release switch (shutter switch) $S_2$ and first release switch (light measuring switch) $S_1$ of the two-step release switch is turned off before the rear screen of the focal-plane shutter has mechanically stopped running. Therefore, the photographing at a low illumination can be perfectly carried out.

The present invention is not limited to the above-described embodiment; it may be modified in various ways.

According to an improved embodiment of the present invention, a system resetting signal $\gamma$ obtained from a pulse generating circuit 12 in a signal generating circuit 9 is also utilized as an instruction signal for the winding up of the film by an automatic film winding means (powerwinder) provided therein. The winding up of the film is effected when the wave of the system resetting signal $\gamma$ is raised at a time $t_6$. In this case, a battery voltage $V_B$ also stops being supplied into a power supplying line 15 in accordance with the fallings of the system resetting signal $\gamma$ and of a power supplying and retaining signal $\gamma'$ at a time $t_7$. Consequently, the supplying of battery voltage into the automatic control circuit is never stopped before the winding up film has been completed. Thus, the film can be wound up with a high reliability.

If the film is wound up before the rear screen of the focal-plane shutter has been stopped or while the rear screen is running, the winding up of the film is not perfectly carried out or erroneous film winding up action may take place. However, according to this embodiment, the film is wound up at the time $t_6$ after the rear screen of the focal-plane shutter has mechanically stopped running at the time $t_5'$ and then, erroneous film winding actions can be prevented or the film winding actions can be stabilized.

The present invention may have many other modes of embodiment. Since the final signal for the camera actions in, for example, an iris-preferential camera control system is also a rear screen control signal and then, the signal may be utilized therein as well.

The circuit for generating a delay signal and the power supplying circuit may also be modified in various ways.

FIG. 4 is a diagram of another embodiment of the present invention provided with an automatic film winding means, in which a system resetting signal $\gamma$ obtained from a pulse generating circuit 12 in a signal generating circuit 9 is utilized for automatic continuous photographing. The system resetting signal $\gamma$ obtained from the pulse generating circuit 12 in the signal generating circuit 9 is applied to an input terminal IN. A switch $S_3$ is used to shift an automatic continuous photographing to a normal photographing, and vice versa. When the switch $S_3$ is connected to one terminal CON, an automatic continuous photographing can be carried out, and, when it is connected to the other terminal SIN, a normal photographing, i.e., photographing of one film per one closing action of a second release switch can be carried out. A solenoid on an electromagnetic relay MG is connected to a common terminal T of the switch $S_3$.

When the system resetting signal $\gamma$ is applied to the solenoid on the electromagnetic relay MG, control switches $SC_1$, $SC_2$ which are series-connected to first release switch $S_1$ and second release switch $S_2$, respectively, are opened. When the system resetting signal $\gamma$ is not applied to the solenoid, the control switches $SC_1$, $SC_2$ are closed. A terminal of the first control switch $SC_1$ is connected to a control circuit 8 and a power supplying control circuit 10 in the automatic control circuit system. A terminal of the second control switch $SC_2$ is connected to the control circuit 8 via a delay circuit consisting of, for example, a resistor Rd and a condenser Cd.

The actions of the automatic control circuit system in the embodiment as shown in FIG. 4 will be described with reference to the wave forms of signals as shown in FIG. 5. In this automatic control circuit system, the change-over switch $S_3$ is connected to a terminal CON for automatic continuous photographing.

When the first release switch $S_1$ is turned on at a time $t_{10}$, the wave thereof is raised as shown in FIG. 5(A). Then, the waves of the front screen control signal $\alpha$ and rear screen control signal $\beta$ are also raised at the time $t_{10}$ as shown in FIGS. 5(C) and 5(D), respectively, so that the front and rear screens of the focal-plane shutter are mechanically held. At the time $t_{10}$, a wave $S_1'$ at a terminal of the control switch $SC_1$ is raised as shown in FIG. 5(H) and a battery voltage VB begins to be supplied into a power supplying line 15 as a battery voltage Vcc as shown in FIG. 5(G).

When the second release switch $S_2$ is turned on at a time $t_{11}$, the wave thereof is raised as shown in FIG. 5(B). At the time $t_{11}$, the front screen control signal $\alpha$ falls as shown in FIG. 5(C), while a power supplying and retaining signal $\gamma'$ is raised as shown in FIG. 5(F).

At a time $t_{13}$ or after the rear screen control signal $\beta$ has fallen at a time $t_{12}$ as shown in FIG. 5(D) to mechanically stop the running of the rear screen, the wave of a system resetting signal $\gamma$ is raised [refer to FIG. 5(E)]. This system resetting signal $\gamma$ is a one-shot pulse having a predetermined pulse width and the wave thereof falls at a time $t_{14}$ [refer to FIG. 3(E)].

The rising at the time $t_{13}$ of the wave of the system resetting signal $\gamma$ is utilized as an instruction signal for winding up the film by an automatic film winding means, and then, the film is automatically wound up at the time $t_{13}$. When a high-level system resetting signal $\gamma$ is applied to a solenoid on an electromagnetic relay MG between the times $t_{13}$ and $t_{14}$ as shown in FIG. 5(E), the first control switch $SC_1$ and second control switch $SC_2$ are opened during the time between the times $t_{13}$ and $t_{14}$ as they are controlled by the relay MG. Consequently, a wave of a signal $S_1'$ at a terminal of the first release switch $SC_1$ falls at the time $t_{13}$.

Since a delay circuit consisting of a resistor Rd and a condenser Cd is connected to a terminal of the second release switch $SC_2$, the wave of a signal obtained from the delay circuit falls at a time $t_{13}'$ which is determined by the delay time of the delay circuit [refer to FIG. 5(I)]. The wave of the signal $S_1'$ is raised at the time $t_{14}$ and the wave of the signal $S_2'$ is raised at a time $t_{14}'$ which is determined by the delay time of the delay circuit as shown in FIGS. 5(H) and 5(I), respectively.

Therefore, when the wave $S_1$ of the signal applied to the control circuit 8 in the automatic control circuit is raised at the time $t_{14}$, the front screen control signal $\alpha$ and rear screen control signal $\beta$ are raised as shown in FIGS. 5(C) and 5(D), respectively, so that the front and rear screens are mechanically held. When the wave $S_2'$, is raised at the time $t_{14}'$ which is determined by the delay time of the delay circuit, so as to be applied to the control circuit 8, the wave of the front screen control signal a falls [refer to FIG. 5(C)] to release the mechanical holding to the front screen. The wave of the rear screen control signal $\beta$ falls at a time $t_{15}$ which is determined by the shutter speed, to release the mechanical holding of the rear screen, to attain automatic continuous photographing actions.

When the system resetting signal $\gamma$ is applied to the control circuit 8 between the times $t_{13}$ and $t_{14}$, a digital shutter speed value T' memorized by the memory circuit 4 and digital information counted by a counter 6 are erased by the control circuit to put the automatic control system as a whole into the original state.

When the rise in the wave of the signal $S_1'$ at the time $t_{14}$ is transmitted to the control circuit 8, continuous control pulses are sent out from the control circuit 8 into a control line 82 to control an A/D converter 3. As a result, the shutter speed T changed in accordance with the change in the measured light value L is converted momentarily into a digital value with the continuous control pulses so that renewed digital shutter speeds T' are momentarily sent out.

When the rise of the wave of the signal $S_2'$ at the time $t_{14}'$ is transmitted to the control circuit 8, a memory control signal is sent out from the control circuit 8 into a control line 83 so that the newest digital shutter speed value T' is memorized by the memory circuit 4. At the time $t_{14}'$, an instruction signal for starting counting is sent out from the control circuit 8 into a control line 84 to allow the counter 6 to start counting the pulse signals applied from an oscillation circuit.

Consequently, while the second release switch $S_2$ is closed between times $t_{11}$ and $t_{19}$, the abovementioned automatic continuous photographing action is repeated. At the time $t_{19}$, the second release switch is opened. After the first release switch has then opened at a time $t_{20}$, the automatic continuous photographing action is stopped.

According to the above embodiment, an automatic continuous photographing action is made in accordance with a digital shutter speed value T' based on a shutter speed value T which is obtained just before the shutter action made by the running front and rear screens of the focal-plane shutter. Then, even when the measured light value L obtained from the photocell during the automatic continuous photographing and amplified by the logarithmic amplifier 1 is varied, the photographing actions can be made under optimum photographing conditions.

What is claimed is:

1. An automatic control circuit system for cameras provided with a focal-plane shutter having front and rear screens, and a two-step release switch comprising a first release switch serving when it is closed to supply a battery voltage into said automatic control circuit system via power switching means and a second release switch serving when it is closed to start the running of said rear screen after a lapse of time corresponding to a predetermined shutter speed, wherein said power switching means includes at least a semiconductor switching element having first and second electrodes and a control electrode, the electrical conduction and non-conduction between said first and second electrodes are controlled by electric signals applied to said control electrode, and said first and second electrodes are connected to a battery and a power supplying line in said automatic control circuit system, respectively, wherein said automatic control circuit system is provided with an electric signal holding circuit which is triggered with an electric signal generated by the closing action of said second release switch to hold an output terminal by an output signal which holds at said control electrode an electric signal which conducts electrically between said first and second electrode of said semiconductor switching element, and wherein said electric signal holding circuit is reversely triggered with an electric signal which is generated based on the closing of said second release switch when an instruction to start the running of said rear screen of said focal-plane shutter is given or after a predetermined period of time has elapsed after said instruction was given, to end the hold at said output terminal of said output signal, characterized in that said control electrode of said semiconductor switching element is actuated by a closing action of said first release switch to conduct electrically between said first and second electrodes without any mechanical or electrical holding operations, so that said semiconductor switching element can end the supply of the supply voltage from said battery to said power supplying line according to the opening action of said first release switch before a closing action of said second release switch.

2. An automatic control circuit system according to claim 1, characterized in that said automatic control circuit system further includes a delay circuit for delaying a rear screen control signal by at least a period of time corresponding to a time starting with the giving of an instruction to start the running of said rear screen by said rear screen control signal and ending with the mechanical stopping of said rear screen, and that said electric signal holding circuit is reversely triggered with a delay signal obtained from said delay circuit.

3. An automatic control circuit system according to claim 2, characterized in that said automatic control circuit system is further provided with a pulse generating circuit connected between an output terminal of said delay circuit and an input terminal of said electric signal holding circuit, that said pulse generating circuit responds to said delay signal to generate a system resetting signal having a predetermined pulse width at least after the mechanical stopping of said rear screen, that the photographing information memorized in the automatic control circuit system is erased by said system resetting signal, and that said electric signal holding circuit is reversely triggered with said system resetting signal.

4. An automatic control circuit system according to claim 3, characterized in that said system resetting signal further serves to instruct winding-up of the film.

5. An automatic control circuit system according to either claims 1, 2, 3 or 4, characterized in that a transistor is used for said semiconductor switching element, that said battery voltage is supplied into said power supplying line via the emitter-collector circuit of said transistor, and that the base electrode of said transistor is used as said control electrode of said semiconductor switching element.

* * * * *